Feb. 2, 1954     P. J. STONESTREET     2,667,715
ANIMAL TRAP
Original Filed Nov. 22, 1934
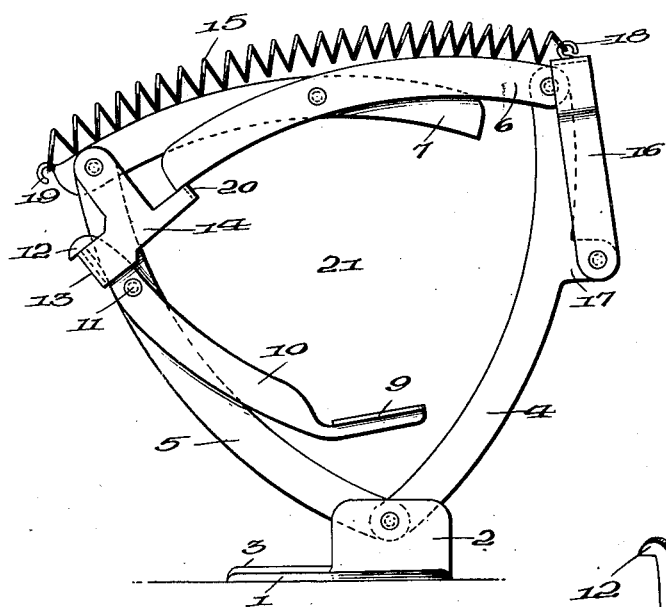
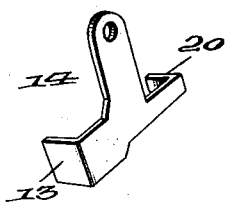
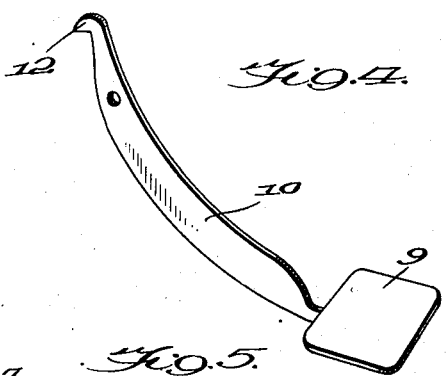
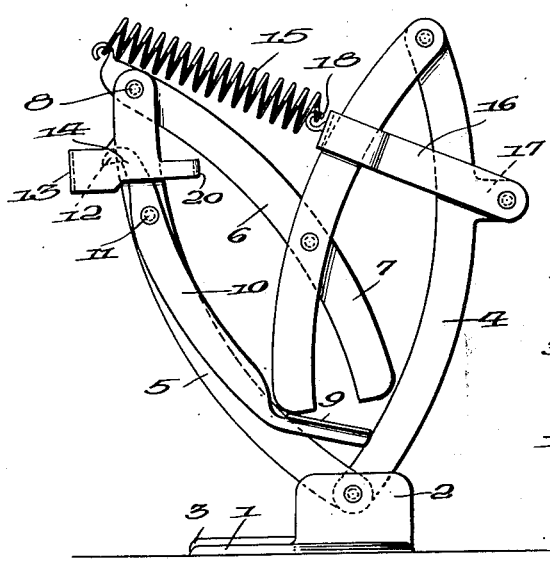
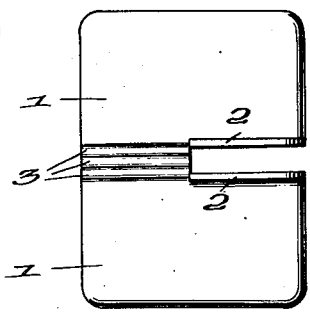
Inventor
P. J. Stonestreet,
By M. K. Saunders
Attorney Patented Feb. 2, 1954

2,667,715

UNITED STATES PATENT OFFICE 2,667,715

ANIMAL TRAP

Purl J. Stonestreet, Cuyahoga Falls, Ohio

Substituted for abandoned application Serial No. 754,352, November 22, 1934. This application May 26, 1951, Serial No. 228,380

3 Claims. (Cl. 43—85)

This invention relates to animal traps and the object of the invention is to provide a trap of such construction that an animal will be trapped by the neck, thus ensuring a quick and humane death.

Another object of the invention is to provide an animal trap from which the trapped animal cannot escape.

Another object of the invention is to provide an animal trap which can adapt itself to various sized animals and which is provided with a positive lock thus preventing the trapped animal from gnawing or working himself free.

Still another object of the invention is to provide an animal trap of but few parts and of simple construction whereby it can be cheaply and economically manufactured.

A further object of the invention is to provide an animal trap which fits into holes neatly and over which the animal cannot jump.

I accomplish the above and other objects of the invention by means of the device shown in the accompanying drawings, in which:

Fig. 1 is a side elevation of my improved trap when set for trapping animals;

Fig. 2 is a side elevation of my improved trap after it has been sprung;

Fig. 3 is a perspective view of the latch trigger for holding the trap in its set position;

Fig. 4 is a perspective of the plate which is operable to spring the trap; and

Fig. 5 is a plan view of the base on which the operating parts of the trap are mounted.

On the drawings, in which like reference characters indicate like parts on all the views thereof, 1 indicates the base support having upstruck lugs 2, 2, and corrugations 3 which serve not only to strengthen the base but also to draw the lugs 2, 2 towards each other in proper position for mounting the trapping structure, as will presently appear.

Pivotally attached to the lugs 2, 2, are supporting arms 4, 5. The arm 5 is formed of spaced duplicate strips of material so that the arm 4 may move freely therebetween at its pivotal portion. By so forming and mounting the arms, they may be formed of relatively light material and yet be sufficiently strong to perform the desired function of mounting the trapping jaws.

Pivotally connected to the arm 4 is a trapping jaw 6, while the cooperating trapping jaw 7 is pivoted to the arm 5. The jaw 6 may also be formed of spaced strips of material, in which case the pivotal point of the jaw 7 will be located therebetween.

The trap springing element consists of a plate 9 carried by a support 10, which support is pivoted to the arm 5 at 11. The support 10 is formed with a hook 12 adapted to engage and hold the cooperating hook 13 forming part of the latch trigger 14, as is clearly shown in Figure 1.

The latch trigger is pivoted to the arm 5 preferably by the same rivet upon which the jaw 7 is mounted.

In order to hold the animal securely trapped after the trap has been sprung, I provide spring means 15 which normally tends to draw the jaws 6 and 7 towards each other. The spring 15 is secured at one end to the element 16 which comprises a strip of material bent to form spaced parallel bars enclosing the arm 4 and pivoted to the extension 17 thereon. The bars forming the element 16 are spaced sufficiently so that the jaw 6 may slide freely therebetween. The coil spring 15 is secured at one end to the hook 18 on the element 16 and at the other end to the hook 19 on the jaw 7.

For holding the trap in its set position, I have provided the latch trigger 14 formed with an angular extension 13 adapted to engage and hold the hook 12 on the plate support 10. The latch trigger 14 is also provided with an angular extension 20 which engages under the jaws 6 to hold the same in its upper or set position.

From the foregoing it will be apparent that, when the parts of the trap are in the set position, as shown in Figure 1, there will be a space 21 between the arms 4, 5 and the jaws 6, 7, through which an animal may pass. Should an animal attempt to pass through this space, however, he will come in contact with the plate 9.

The pressure of the animal on the plate 9 will move the plate downwardly, thus throwing the plate support inwardly and relieving the hook 12 from the hook 13 of the latch trigger. The latch trigger will then swing downwardly to the position shown in Figure 2, thus releasing the jaw 6. As the spring is under tension when the trap is set, the release of the jaw 6 will permit the spring to resume its normal position and thereby draw the jaws 6 and 7 towards each other. The animal will thus be caught and held securely by the neck, the trap resisting all efforts of the animal to free itself. If not killed outright, the animal will be quickly choked to death.

It will thus be seen that I have provided a cheap and practical trap which functions in a humane and positive manner.

The present application is a substitute for applicant's previous abandoned application Serial No. 754,352.

Having thus described my invention, what I claim as new and desire to secure by Letters Patent is:

1. An animal trap comprising pivotally positioned supporting arms, trapping jaws carried by said supporting arms, and pivoted thereto adjacent their upper ends and extending downwardly therebetween, spring means for normally holding the free ends of said jaws in their lower trapping relation, said spring means including a coil spring and a link pivotally carried at one end by a said supporting arm adjacent a free end thereof, said link at its free end engaging one end of said coil spring and extending up over the free end of the said supporting arm on which it is positioned to aid in moving said trapping jaws to operative position when released, a latch for holding said jaws in inoperative relation against the action of the spring means with their free ends in their upper position, and animal operated means for releasing the latch.

2. An animal trap comprising a V-shaped support, downwardly extending trapping jaws pivotally carried by said support and extending between the open end thereof, spring means for normally holding said jaws in trapping position intermediate the arms of said support, a latch carried by said support adjacent the end of one arm thereof for holding said jaws in inoperative position against the action of the spring, said latch detachably engaging one of said jaws, and animal operated means for releasing said latch, said last named means detachably engaging said latch.

3. A trap for animals, and adapted to be inserted in an animal hole and of substantially ring shaped form including a pair of jaws forming one side of the ring and pivotally connected in scissor-like manner, spring means tending to move the scissor-like jaws to animal-gripping position, latch means holding the jaws in fully open position, lock means for holding the jaws in animal-gripping position, and trip means in the path of movement of the animal through the ring of the trap for releasing the latch means.

PURL J. STONESTREET.

References Cited in the file of this patent

UNITED STATES PATENTS

| Number | Name | Date |
| --- | --- | --- |
| 409,592 | Kidder | Aug. 20, 1889 |
| 1,165,209 | Russell | Dec. 21, 1915 |
| 1,404,070 | Thompson | Jan. 17, 1922 |
| 1,571,432 | Powell | Feb. 2, 1926 |
| 1,580,583 | Cotlin | Apr. 13, 1926 |
| 1,764,225 | Raymond | June 17, 1930 |
| 2,578,856 | Story | Dec. 18, 1951 |